United States Patent Office 3,412,128
Patented Nov. 19, 1968

3,412,128
METHOD FOR HYDROLYZING HALOSILANES
John M. Nielsen, Burnt Hills, N.Y., assignor to General Electric Company, a corporation of New York
No Drawing. Filed May 13, 1964, Ser. No. 367,248
19 Claims. (Cl. 260—448.2)

ABSTRACT OF THE DISCLOSURE

A partial hydrolysis method is provided for making low molecular weight halogen-terminated organopolysiloxane from organohalosilane. A nitrogen-containing catalyst, such as pyridine, is employed in combination with hydrogen halide to minimize the formation of cyclopolysiloxane and higher molecular weight organopolysiloxane. The low molecular weight halogen-terminated organopolysiloxane which is provided can be employed as an intermediate for making organopolysiloxane block copolymers.

---

The present invention relates to a method for effecting the partial hydrolysis of halosilanes. More particularly, the present invention relates to a method for catalyzing the formation of relatively low molecular weight halogenated polysiloxane with a mixture of hydrogen halide and certain organic materials having at least one nitrogen atom or phosphorous atom chemically bonded to a carbon atom.

Prior to the present invention, numerous partial hydrolysis methods were known for making halogenated polysiloxane consisting essentially of chemically combined siloxy units having the formula, (1) 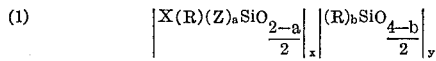

where R is selected from hydrogen, a monovalent hydrocarbon radical and a halogenated monovalent hydrocarbon radical. X is a halogen radical, Z is either X or R, $a$ is a whole number equal to 0 or 1, $b$ is an integer equal to from 1 to 3, inclusive, $x$ is an integer equal to 1 to 10, inclusive, $y$ is a whole number equal to from 0 to 9, inclusive and when $b$ is equal to 3, $y$ is equal to 0 to 2, inclusive, and the sum of $x$ and $y$ is equal to 2 to 10, inclusive. Generally, these methods involve the addition of water to halosilane consisting essentially of organohalosilane of the formula, (2) $(R)_b Si(X)_{4-b}$ where R, X and $b$ are defined above.

Radicals represented by R of Formula 1 can be all the same or they can be different. Radicals included by R of Formula 1 are for example, hydrogen, aryl radicals, and halogenated aryl radicals such as phenyl, chlorophenyl, xylyl, tolyl, etc., aralkyl radicals such as phenylethyl, benzyl, etc.; aliphatic, haloaliphatic, and cycloaliphatic radicals such as alkyl, alkenyl, cycloalkyl, haloalkyl, including methyl, ethyl, propyl, butyl, cyclohexyl, etc. Radicals included by X of Formula 1 are chloro, bromo, iodo, etc.

Halosilanes included by Formula 2 are for example, methyltrichlorosilane, methyldichlorosilane, dimethyldichlorosilane, dimethylchlorosilane, trimethylchlorosilane, phenyltrichlorosilane, methylphenyldichlorosilane, diphenyldichlorosilane, phenyldichlorosilane, etc. In addition, minor amounts of a silicon tetrahalide such as silicon tetrachloride also can be included.

Available methods for making halogenated polysiloxane of Formula 1 are undesirable because the principal reaction products are generally cyclics, unreacted halosilane and comparatively high molecular weight linear reaction products. In addition, procedures utilized to improve the yield of halogenated polysiloxanes of Formula 1 generally require uneconomic operating conditions. For example. Patnode Patent 2,381,366 assigned to the same assignee as the present invention, shows a method for making a halogen-terminated polysiloxane included by Formula 1. A chlorine chain-stopped polydimethylsiloxane is made by carefully adding water to a solution of dimethyldichlorosilane and ether at low temperatures. Although Patnode's method can be utilized for the production of low molecular weight chlorine-terminated polydimethylsiloxane, hydrolysis must be performed at reduced temperatures and a hazardous organic solvent such as ether must be utilized. Another method that can be utilized for making halogen-terminated polydimethylsiloxane is shown by Sauer Patent 2,421,653, involving the reaction between polydimethylsiloxane and a methylchlorosilane at elevated conditions of pressure and temperature. Sauer's method also is quite valuable for making halogen-terminated polydimethylsiloxane; it requires however, the employment of extreme conditions of temperature and pressure, and an undesirable amount of higher molecular weight halogen-terminated polydimethylsiloxane is produced. An additional method is shown by Burkhardt, J. Am. Chem. Soc., 67, 2173 (1945), who reports that the hydrolysis of diphenyldichlorosilane results in the production of only a 20% yield of the desired 1,3-dichlorotetraphenyldisiloxane.

The present invention is based on the discovery that if halosilane shown by Formula 2 is partially hydrolyzed in the presence of hydrogen halide and an effective amount of an organic material having a carbon-nitrogen linkage or a carbon-phosphorous linkage for example, pyridine, pyridine hydrochloride, triphenylphosphine, etc., an unexpectedly high proportion of halogenated polysiloxane of Formula 1 is produced. Generally, the organic material can be any one of a variety of basic organic compounds and products resulting from mixing such basic organic compounds and hydrogen halide. Basic organic compounds that can be employed in the present invention can be broadly included within the term "Lewis Base." Specifically the basic organic compounds that can be employed in the invention include organic bases having at least one carbon-nitrogen linkage or carbon-phosphorous linkage.

In a method for making halogenated polysiloxane of Formula 1, involving (A) partially hydrolyzing halosilane of Formula 2, (B) stripping the resulting hydrolysis mixture and (C) recovering the resulting overhead product from (B), there is provided by the present invention, the improvement which comprises partially hydrolyzing said halosilane in the presence of hydrogen halide and an effective amount of an organic material selected from:

(1) A carbon-phosphorous compound having the formula, (3)  $(K)_j P(H)_k$, and (2) A carbon-nitrogen compound having at least one $\equiv C-N=$ linkage in which the remaining valences of the carbon atom of said linkage are satisfied by a member selected from hydrogen, oxo, thioxo, and a radical consisting essentially of chemically combined atoms selected from the class consisting of (i) H and C
(ii) H, C and O
(iii) H, C and S
(iv) and mixtures thereof, and the remaining valences of the nitrogen atom of said linkage are satisfied by a member selected from the class consisting of H, hydroxy, a radical selected from the class consisting of (i), (ii), (iii), (iv), and a radical consisting essentially of chemically combined atoms selected from the class consisting of (v) N and H
(vi) N, C and H,
(vii) and mixtures thereof, (3) Products formed by mixing (1) or (2) and a hydrogen halide, where K is a radical selected from aryl, $(R)_2N$, and $H(CR'_2)_n$, R is defined above, R' is selected from hydrogen, alkyl, and cycloalkyl, $n$ is an integer equal to 1 to 8, inclusive, $j$ is an integer equal to 1 to 3, inclusive, $k$ is a whole number equal to 0 or 1, the sum of $j$ and $k$ is equal to 3, and the product of $n$ and $j$ has a value of at least three.

Carbon-nitrogen compounds that can be employed in the invention having a heterocyclic structure in which a ring nitrogen is linked exclusively to hydrogen and to electron-withdrawing radicals, such as carbonyl radicals as found for example, in imides, preferably have at least one nitrogen atom substituted with a monovalent hydrocarbon radical or halogenated monovalent hydrocarbon radical. Acyclic carbon-nitrogen compounds of the invention having nitrogen exclusively joined to hydrogen and to electron withdrawing radicals, for example, carbonyl radicals, also preferably have at least one nitrogen atom substituted with a monovalent hydrocarbon radical or halogenated monovalent hydrocarbon radical.

It is also preferred to utilize carbon-nitrogen compounds having at least one monovalent aliphatic radical or halogenated monovalent aliphatic radical attached to nitrogen where the carbon-nitrogen linkage has been exclusively created by $NH_2$ attached directly to an aromatic radical such as phenyl. In instances where the nitrogen functionality of the carbon-nitrogen compound is exclusively in the form of —CN, it is preferred that the carbon atom of the carbon-nitrogen linkage be directly attached to organic radicals free of benzenoid unsaturation.

Included by the organic materials that can be employed in the invention are materials having a carbon-nitrogen bond selected from:

(A) Carbon-nitrogen compounds having a radical $$(T)_k \underset{(V)_e}{\overset{(W)_f}{N-}}$$

chemically bonded by a carbon-nitrogen linkage to a radical selected from $$\underset{(Q)_c}{\overset{(U)_d}{-C-Y}}$$

and M, where M is a monovalent carbocyclic radical, Y is a member selected from R, as defined above, a monovalent acyclic radical consisting essentially of chemically combined hydrogen and carbon atoms and at least one nitrogen atom, a monovalent acyclic radical composed of chemically combined carbon atoms, hydrogen atoms, and oxygen atoms, and a monovalent acyclic radical consisting essentially of chemically combined carbon atoms, hydrogen atoms, and sulfur atoms; U is a member selected from R, oxo and thioxo, W can be R, V is a member selected from R, a monovalent acyclic radical consisting essentially of chemically combined hydrogen atoms, carbon atoms, and at least one nitrogen atom, and a monovalent acyclic radical composed of chemically combined carbon atoms, hydrogen atoms, and oxygen atoms; T is alkyl with an associated halide ion, $c$, $d$, $e$, $f$, and $g$ are whole numbers equal to 0 or 1, where $g$ is equal to 1, W or V are alkyl.

(B) Heterocyclic carbon-nitrogen compounds selected from monocyclic saturated compounds consisting essentially of chemically combined carbon atoms and hydrogen atoms, and at least one nitrogen atom within the ring structure; monocyclic unsaturated compounds consisting essentially of chemically combined carbon atoms and hydrogen atoms and at least one nitrogen atom within the ring structure; polycyclic saturated compounds consisting essentially of chemically combined carbon atoms and hydrogen atoms and at least one nitrogen atom within the ring structure; polycyclic unsaturated compounds consisting essentially of chemically combined carbon atoms and hydrogen atoms and at least one nitrogen atom within the ring structure; saturated compounds consisting essentially of chemically combined carbon atoms and hydrogen atoms, and at least one nitrogen atom in the ring structure, and having carbon and hydrogen bridges.

More specifically, the carbon-nitrogen compounds that are preferably employed in the invention, are amines $$R''NR_2; L[NR_2]_h; L'[N(R'')R]_h$$

and quaternary salts that can be formed from these amines; carbonyl-containing carbon-nitrogen compounds or derivatives thereof, such as, (a) Amides and imides having the structure,

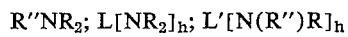

(b) Carbonic acid derivatives $R''RNCONR_2$;

$$(R_2N)_2C=NR$$

(c) Hydrazines, hydrazides, hydrazones,

imines, nitriles and cyanamides, $R_2C=NR''$; $M'(CN)_p$; $R_2NCN$, where R is as defined above, R'' is selected from monovalent aliphatic hydrocarbon radicals and halogenated monovalent aliphatic hydrocarbon radicals, R''' is selected from monovalent aliphatic hydrocarbon radicals, monovalent aromatic hydrocarbon radicals, halogenated monovalent aliphatic hydrocarbon radicals, and halogenated monovalent aromatic hydrocarbon radicals, L is selected from polyvalent aliphatic hydrocarbon radicals and halogenated polyvalent aliphatic hydrocarbon radicals, L' is selected from polyvalent aromatic hydrocarbon radicals and halogenated polyvalent aromatic hydrocarbon radicals, M' is selected from an aliphatic hydrocarbon radical and a halogenated aliphatic hydrocarbon radical, $h$ is an integer greater than 1, and $p$ is a positive integer.

In addition, monocyclic hetero nitrogen-containing compounds consisting essentially of chemically combined carbon and hydrogen atoms and having at least one carbon-nitrogen linkage are also among the preferred carbon-nitrogen compounds.

Some of the carbon-nitrogen compounds that can be employed in the present invention are for example, alkyl amines, $R''N(R')_2$, such as primary, secondary, and tertiary amines, for example, methyl amine, ethyl amine, propyl amine, isopropyl amine, secondary butyl amine, dimethyl amine, diethyl amine, dibutyl amine, trimethyl amine, triethyl amine, etc.; aryl amines having R'' radicals attached to nitrogen such as methyl aniline, dimethyl aniline, etc. Also included are polyamines such as ethylenediamine, propylenediamine, trimethylenediamine, hexamethylenediamine, N,N,N',N' - tetramethylethylenediamine, etc.; phenylenediamine, tolylenediamine, N,N'-dimethylphenylenediamine, etc. Quaternary salts such as tetraethylammonia chloride, etc. also are operable.

Further examples of nitrogen-containing organic compounds that can be employed are carbonyl-containing compounds such as amides, for example, formamide, acetamide, dimethylformamide, acetanilide, etc.; imides, for example, succinimide, phthalimide, N-amylsuccinimide, biuret, etc.; lactams, ureas, and monovalent hydrocarbon substituted ureas; there are also included sulfur analogues of the aforementioned amides, imides, and ureas. Further related nitrogen compounds are imines, guanidines, amidines; nitriles such as butyronitrile and adiponitrile; cyanamides, etc. Hydrazine and monovalent hydrocarbon substituted hydrazine analogues of the above-described classes of carbon-nitrogen compounds also can be employed in the practice of this invention; for example, N,N-dimethylhydrazine, the N,N-diethylhydrazine of acetic acid, N-methyl-N-phenylhydrazine analogue of acetamidine, methylhydrazine analogue of urea, methylhydrazone of acetone, etc. Compounds containing several nitrogen functionalities in the same molecule can also be employed, for example, cyanoguanidine, guanylurea, etc.

Among the preferred carbon-nitrogen compounds that can be employed in the practice of the present invention are numerous heterocyclic nitrogen-containing compounds. For example, there can be employed quinolines, pyridines, piperidines, isoquinolines, etc. Further examples are pyrrolines, pyrrolidines, benzoquinolines, pyrazoles, pyrazolines, pyrazolidines, imidazoles, imidazolines, imidazolidines, pyridazines, pyrimidines, piperazines, triazines, triazines, benzimidazoles, cinnolines, phthalazines, quinazolines, quinoxalines, naphthopyridines, acridines, phenazines, phenanthridines, phenanthrolines, oxazoles, oxazolines, 2-pyrrolidinones, 3-pyrroline-2-ones, 2-pyridones, 2,5-piperazinediones, ethyleneureas, hydantoins, 2-pyrazolones, uracils, quinazolone, etc. Additional examples of the organic compounds containing nitrogen that can be employed in the practice of the invention are shown on pages 705 to 716 of volume I of the Encyclopedia of Chemical Technology, The Interscience Encyclopedia, Inc., New York (1954). Also, pages 723–900 of Organic Chemistry, volume IV, by Gilman, John Wiley and Sons, New York (1953).

In addition to the above-described organic materials having carbon-nitrogen linkages, also included as organic material are the carbon-phosphorous compounds of Formula 3. There are included for example, phosphines, such as tributylphosphine, triphenylphosphine, etc.; amides of phosphorous such as hexamethylphosphorous triamide, triphenylphosphorous triamide, etc.

As previously indicated, the organic materials that can be employed in the practice of the invention, also include products formed by mixing the above-described carbon-nitrogen or carbon-phosphorous compounds with a hydrogen halide. For example, the organic material can include pyridine, pyridine hydrochloride, pyridine dihydrochloride, etc. In accordance with the practice of the invention effective results can be achieved by hydrolyzing halosilane of Formula 2 in the presence of a mixture of hydrogen halide and the organic material. During hydrolysis, it has been found necessary to provide for a concentration of hydrogen halide which is sufficient to maintain in the hydrolysis mixture an excess of halide units sufficient to exceed the number of nitrogen atoms, phosphorous atoms or mixture thereof chemically bonded to carbon atoms.

The organic material can be utilized directly in the mixture as an organic compound, or it can be employed as the product formed by mixing the organic compound with hydrogen halide. Experience has shown that when utilized with hydrogen halide, the organic material can be employed over wide weight proportions in the hydrolysis mixture. However, a proportion of organic material in the range of from about 0.5% to less than 500% based on the weight of water utilized, is preferred.

When the organic material is utilized in the hydrolysis mixture as a carbon-nitrogen or carbon-phosphorous compound, such as for example, pyridine, care must be taken to insure that sufficient uncombined hydrogen halide is present during the hydrolysis. Preferably, in these situations, it has been found desirable to employ an amount of the organic compound that is less than about ½ of that required to completely accept all of the available hydrogen halide derived from the hydrolysis of the halosilane. However, in instances where higher amounts of organic compound are employed, such as up to stoichiometric amounts, hydrogen halide other than that formed during the hydrolysis can be utilized in the mixture. For example, an aqueous hydrochloric acid solution can be substituted for water to hydrolyze the halosilane, hydrogen chloride can be bubbled into the hydrolysis mixture, etc.

A preferred form of the halogenated polysiloxane which is included by Formula 1 are polymers of the formula, (4) 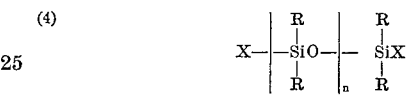

where R and X are as defined above, and $n$ is an integer equal to 1 to 9, inclusive. Another form of halogenated polysiloxane that is included by formula is (5) 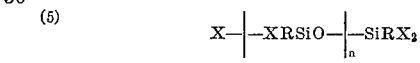

where X, R and $n$ are the same as above.

In the practice of the invention, the halogenated polysiloxane of Formula 1 is made by partially hydrolyzing halosilane of Formula 2 in the presence of the organic material. It is preferred to effect hydrolysis by adding water to the halosilane. In instances where the organic material is in the form of a water soluble organic compound it can be introduced in the form of a water solution; if desired, the organic material also can be added to the halosilane prior to the addition of water.

In effecting the hydrolysis of halosilane, it has been found that optimum results are usually obtained if a ratio of water to halosilane is utilized that is equivalent to less than about 0.7 mole of water per mole of halosilane having an average of about two halogen radicals per silicon atom. For example, in instances where diorganodihalosilane is partially hydrolyzed, less than 0.7 mole of water per mole of halosilane is preferably employed. A higher proportion of water to halosilane exceeding the aforementioned ratio has been found to favor the formation of cyclics, or in ceratin cases silanols. Lower proportions of water, such as as little as 0.1 mole of water or less, per mole of halosilane having an average ratio of about two halogen atoms per silicon atom can be satisfactorily employed. In particular instances, the employment of excess halosilanes has been found desirable when making halogenated polysiloxane of Formula 1, having as little as two or three chemically combined siloxy units.

It has been found expedient to agitate the reaction mixture during the hydrolysis to insure intimate contact between reactants, and the organic material. In certain situations, particularly when hydrolyzing organotrihalosilane, the employment of an inert organic solvent such as benzene, toluene, xylene, mineral spirits, etc. has been found desirable. A temperature in the range of between −20° C. to reflux can be employed during hydrolysis. Hydrolysis at temperatures between 10° C. to 120° C., and preferably between 20° C. to 100° C. will provide for effective results.

At the termination of the hydrolysis and preferably when the evolution of hydrogen halide has substantially ceased, it has been found expedient to separate the organic reaction product from the reaction mixture using methods such as decantation, filtration, separation of a liquid phase, etc. The hydrolyzate then can be stripped of volatiles such as unreacted starting material, solvents, etc. The separation of the desired products can be achieved by such procedures as fractional distillation, molecular distillation, etc.

In order that those skilled in the art will be better able to practice the invention, the following examples are given by way of illustration and not by way of limitation. All parts are by weight.

Example 1

There was added a mixture of 36 parts of water and 40 parts of pyridine to 1,265 parts of diphenyldichlorosilane heated to a temperature of 85° C. During the addition, which lasted about 1 hour, HCl was continuously evolved. The mixture was stirred for an additional ½ hour at 85° C.; it was cooled to room temperature; filtered under suction to remove insoluble pyridine salts. The filtrate was then fractionally distilled under reduced pressure. There were obtained 626 parts of 1,3-dichlorotetraphenyldisiloxane which represented a 55.5% yield of product based on starting material. In addition, there were also obtained 331 parts of unreacted diphenyldichlorosilane and 133 parts of higher boiling residue.

Example 2

There were added 36 parts of water over a period of 1 hour to a mixture of 1,265 parts of diphenyldichlorosilane, 866 parts of toluene, and 393 parts of pyridine dihydrochloride. During the addition, the mixture was heated and stirred at a temperature of 80° C. to 85° C. The mixture was stirred for an additional hour at this temperature, and then allowed to cool to 20° C. The pyridine dihydrochloride was removed by filtering the mixture, and the filtrate was fractionated under reduced pressure. There were obtained 730 parts of 1,3-dichlorotetraphenyldisiloxane which represented a yield of 64.7%. There were also obtained 201 parts of unreacted diphenyldichlorosilane, and 123 parts of a higher boiling residue consisting principally of 1,5-dichlorohexaphenyltrisiloxane.

Example 3

There were added 20 parts of water to a mixture of 400 parts of toluene, 500 parts of amyltrichlorosilane, and 1 part of pyridine. During the addition, the mixture was held at reflux. Reflux of the mixture was continued, and the toluene and unreacted amyltrichlorosilane were separated from the mixture by fractional distillation. The mixture was then distilled under reduced pressure to effect the separation of the reaction product. The same procedure was repeated except that no pyridine was used in the reaction mixture.

Table I shows the results obtained. The figures in the table are expressed in parts by weight. "Fraction 1" indicates the weight of the fraction distilled to a temperature between 140° C. to 200° C. (5.5 mm.); its chlorine content of about 37% shows it is principally the disiloxane. "Fraction 2" was separated at a temperature between 200° C. to 300° C. (7.5 mm.); its percent chlorine of about 30% shows it includes components up to at least about the linear hexasiloxane which has a theoretical weight percent chlorine of 30.8%. The "Residue" indicates product remaining after the hydrolysis mixture was stripped to 300° C. (7.5 mm.). Based on its weight percent chlorine, the residue was principally cyclics and higher linear polysiloxane.

TABLE I.—Partial Hydrolysis of Amyltrichlorosilane

| Pyridine | Fract. 1 | Fract. 2 | Residue |
| --- | --- | --- | --- |
| 0 | 14 | 17 | 75 |
| 1 | 31 | 101 | 19 |

Example 4

There was added over a period of about 3 hours, a mixture of 153 parts of water, and 147 parts of pyridine to 2,513 parts of methylphenyldichlorosilane maintained at a temperature between 20° C. to 25° C. The mixture was stirred for ½ hour; it was filtered to remove solids. The mixture was then stripped to 165° C. (20 mm.) to remove unreacted methylphenyldichlorosilane. The stripped product was then distilled at 1 mm. There were obtained 468 parts of a first fraction collected at a temperature between 150° C. to 200° C.; a second fraction of 1021 parts was collected between 200° C.–300° C. There remained 51 parts of a high boiling residue. Based on boiling points and chlorine analyses, the first fraction was a chlorine-terminated hydrolyzate composed of about 2 to 3 chemically combined methylphenylsiloxy units; the second fraction had an average of about 4.2 chemically combined methylphenylsiloxy units.

The above procedure was repeated except the reaction temperature was maintained between 65° C. to 70° C. during the addition of water and pyridine. Another hydrolysis was run in accordance with the same procedure, in the absence of pyridine. Additional reactions were run following the same procedure, employing in place of pyridine a variety of other materials.

The results of the above methylphenyldichlorosilane hydrolyses are shown below in Table II. "Temperature" shows the temperature during the addition of water. There is also indicated the various materials employed during the hydrolyses as well as the parts employed.

TABLE II

| Temperature (° C.) | Fract. 1 | Fract. 2 | Residue |
| --- | --- | --- | --- |
| 10-65 | 315 | 418 | 809 |
| 20-100 CaCl₂ (208) | 78 | 237 | 870 |
| 20-25 Pyridine (147) | 468 | 1,021 | 51 |
| 65-70 Pyridine (147) | 807 | 1,142 | 62 |
| 20-40 Pyridine HCl (50) | 564 | 949 | 148 |
| 0-20 N,N-dimethylaniline (135) | 456 | 975 | 75 |

Example 5

A solution of 30 parts of dimethylformamide, and 30 parts of water was added with stirring to 517 parts of dimethyldichlorosilane. During the addition, which lasted 1½ hours, the mixture was maintained at a temperature between 20° C. to 27° C. The temperature was then raised to reflux for 15 minutes to complete the reaction and evolve hydrogen chloride. A liquid catalyst phase separated; it was removed. The polydimethylsiloxane phase was distilled. There were obtained at a temperature to 100° C., 103 parts of a first fraction consisting principally of dimethyldichlorosilane. Three additional fractions were collected to a temperature up to 186° C., (5.5 mm.) These fractions amounted to 266 parts of chlorine-terminated polydimethylsiloxane ranging from about 2–8 chemically combined dimethylsiloxy units. In addition, there remained 3 parts of residue composed principally of higher molecular weight linear polydimethylsiloxane.

Based on the above results, the effectiveness "E" of dimethylformamide was calculated. E indicates the maximum percent by weight of distilled halogenated polysiloxane within the scope of Formula 1, (266 parts) based on the total weight of halogenated polysiloxane (269) which includes 3 parts of residue produced by hydrolyzing organohalosilane included by Formula 2. E of dimethylformamide was 98.9%.

The above reaction was repeated with different organic materials, including hydrochlorides of various organic compounds to determine the effectiveness of these materials in the practice of the invention. Table III shows the results obtained where the "E's" are expressed as a maximum percent and are calculated as above.

TABLE III
Hydrolysis of dimethyldichlorosilane

| | E |
|---|---|
| No Organic material | 60–70 |
| Ammonium chloride | 69.0 |

Acyclic compounds

| | |
|---|---|
| Dimethylformamide | 98.9 |
| Guanidine carbonate | 92.8 |
| Urea | 82.0 |
| Acetamide | 66.0 |
| Diisobutylamine | 96.4 |
| N,N-dimethylacetamide | 98.6 |
| N,N-dibutylacetamide | 97.4 |
| Tetraethylammonium chloride | 98.2 |
| Isopropylaminehydrochloride | 98.4 |
| N-methylacetamide | 98.4 |
| Tetramethylethylenediamine | 96.0 |
| Ethylenediaminehydrochloride | 98.0 |
| Adiponitrile | 98.8 |

Carbocyclic compounds

| | |
|---|---|
| Diphenylformamide | 99.5 |
| Acetanilide | 86.0 |
| Phenylcyanide | 85.0 |
| N-methylanilinehydrochloride | 98.9 |

Heterocyclic compounds

| | |
|---|---|
| 4-picoline | 97.2 |
| Succinimide | 81.0 |
| Isoquinoline | 97.4 |
| Pyridine | 97.3 |
| Benzothiazole | 83.9 |
| 4-phenylmorpholine | 96.6 |
| N-methylpyrollidone | 99.1 |
| N-amylsuccinimide | 93.7 |

Example 6

There were added 20 parts of water to a stirred solution of 31 parts of triphenylphosphine and 346 parts of dimethyldichlorosilane. The addition was completed after 1⅓ hours while the temperature of the mixture was maintained between 26° C. to 33° C. The mixture was then heated to reflux until all of the hydrogen chloride had evolved. The mixture was then allowed to stand for several hours and filtered. The mixture was distilled to a temperature to 155° C. (1 mm.) resulting in the recovery of four fractions. The first fraction to 100° C. was 87 parts of the starting dimethyldichlorosilane. The remaining three fractions of 171.5 parts consisted essentially of chlorine chain-stopped dimethylsiloxane of between about 2 to 6 chemically combined dimethylsiloxy units; the residual siloxane of higher molecular weight amounted to 4 parts. The E of triphenylphosphine was 97.5%.

Based on the above results shown in the examples and Tables I–III, those skilled in the art would know that the present invention provides for results that could not have been anticipated in view of the teachings of the prior art. Examples 1 and 2 clearly establish that significantly higher yields of low molecular weight halogenated polysiloxane having aryl radicals attached to silicon can be achieved by the practice of the invention as compared to the methods of the prior art. Tables II and III show that a wide variety of organic materials containing C–N bonds can be utilized in the practice of the invention to achieve significantly higher yields of low molecular weight chlorine-terminated polydimethylsiloxane as compared to methods that are not practiced in accordance with the present invention.

While the foregoing examples have of necessity been limited to only a few of the very many variables within the scope of the present invention, it should be understood that the present invention provides for the production of a much broader class of halogenated polysiloxane of Formula 1 which can be made by hydrolyzing halosilane of Formula 2 in the presence of a mixture of hydrogen halide and the organic material which is more specifically defined above.

What I claim as new and desire to secure by Letters Patent of the United States is:

1. In a method for partially hydrolyzing halosilane consisting essentially of organohalosilane of the formula,

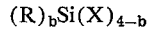

resulting in the production of a hydrolysis mixture comprising,
(A) halogenated organopolysiloxane of the formula,

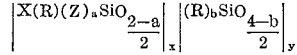

(B) organopolysiloxane having a higher molecular weight than (A),
(C) organocyclopolysiloxane, and
(D) hydrogen halide,
where R is a member selected from the class consisting of hydrogen, a monovalent hydrocarbon radical, and a halogenated monovalent hydrocarbon radical, X is a halogen radical, Z is either X or R, $a$ is a whole number equal to 0 or 1, $b$ is an integer equal to from 1 to 3, inclusive, $x$ is an integer equal to 1 to 10, inclusive, $y$ is a whole number equal to from 0 to 9, inclusive, and when $b$ is equal to 3, $y$ is equal to 0 to 2, inclusive, and the sum of $x$ and $y$ is equal to 2 to 10, inclusive, the improvement which comprises, partially hydrolyzing said organohalosilane in the presence of an organic material selected from,
(E) a carbon-phosphorus compound
(F) a carbon-nitrogen compound, and
(G) a reaction product of hydrogen halide and a member selected from the class consisting of (E) and (F), where (E) has the formula,

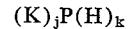

(F) is a carbon-nitrogen compound having at least one =C—N= linkage in which the remaining valences of the carbon atom of said linkage are satisfied by a member selected from the class consisting of hydrogen, oxo, thioxo, and a radical consisting essentially of chemically combined atoms selected from the class consisting of
(i) H and C
(ii) H, C and O
(iii) H, C and S
(iv) and mixtures thereof, and the remaining valences of the nitrogen atom of said linkage are satisfied by a member selected from the class consisting of H, hydroxy, a radical selected from the class consisting of (i), (ii), (iii), (iv) and a radical consisting essentially of chemically combined atoms selected from the class consisting of
(v) N and H
(vi) N, C and H
(vii) and mixtures thereof, where K is a radical selected from the class consisting of aryl, $(R)_2N$, and $H(CR'_2)_n$, R' is selected from the class consisting of hydrogen, alkyl, and cycloalkyl, $n$ is an integer equal to 1 to 8, inclusive, $j$ is an integer equal to 1 to 3, inclusive, $k$ is a whole number equal to 0 or 1, the sum of $j$ and $k$ is equal to 3, and the product of $n$ and $j$ has a value of at least 3, where said organic material is utilized in an amount effective to minimize the formation of (B) and (C) in said hydrolysis mixture, while maintaining a sufficient concentration of hydrogen halide during said partial hydrolysis so that the number of halide radicals of hydrogen halide exceed the number of phosphorus atoms attached to carbon of (E) and the number of nitrogen atoms attached to carbon of (F).

2. A method in accordance with claim 1 where the organic material is a carbon nitrogen compound.

3. A method in accordance with claim 1, where the organic material is a carbon-phosphorus compound.

4. A method in accordance with claim 1, where the organic material is a reaction product of a hydrogen halide and a member selected from the class consisting of the phosphorus compound and the nitrogen compound.

5. A method in accordance with claim 1, where the organic material is a carbon-nitrogen heterocyclic material.

6. A method in accordance with claim 1, where the organic material is pyridine.

7. A method in accordance with claim 1, where the organic material is a pyridine hydrochloride.

8. A method in accordane with claim 1, where the organic material is triphenylphosphine.

9. A method in accordane with claim 1, where the organic material is an amine selected from the class conisting of

where R″ is a member selected from the class consisting of monovalent aliphatic hydrocarbon radicals and halogenated monovalent aliphatic hydrocarbon radicals, L is member selected from the class consisting of polyvalent aliphatic hydrocarbon radicals and halogenated polyvalent aliphatic hydrocarbon radicals, L′ is a member selected from the class consisting of polyvalent aromatic hydrocarbon radicals and halogenated polyvalent aromatic hydrocarbon radicals, $h$ is an integer greater than 1, and equal to the valence of L or L′.

10. A method in accordance with claim 1, where the organic material is an amide having the formula,

RCONRR‴ where R‴ is a member selected from the class consisting of alkyl radicals and aryl radicals.

11. A method in accordance with claim 1 where said halogenated polysiloxane has the formula, where R is a

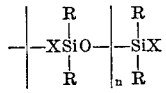

member selected from the class consisting of hydrogen, a monovalent hydrocarbon radical and a halogenated monovalent hydrocarbon radical, X is a halogen radical, and $n$ is an integer equal to 1 to 9, inclusive.

12. A method in accordance with claim 1 where said halogenated polysiloxane has the formula,

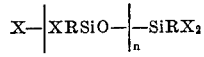

where R is a member selected from the class consisting of hydrogen, a monovalent hydrocarbon radical and a halogenated monovalent hydrocarbon radical, X is a halogen radical, and $n$ is an integer equal to 1 to 9, inclusive.

13. A method in accordance with claim 1 where halogenated polysiloxane is a chlorine-terminated polydimethylsiloxane having from 2 to 10 chemically combined dimethylsiloxy units.

14. A method in accordance with claim 1 where the halogenated polysiloxane is a chlorine-terminated polydiphenylsiloxane having from 2 to 10 chemically combined polydiphenylsiloxy units.

15. A method in accordance with claim 1 which comprises (1) hydrolyzing diphenyldichlorosilane in the presence of hydrogen chloride and an effective amount of pyridine, (2) stripping the resulting hydrolysis mixture, and (3) recovering from (2) as an overhead product, 1,3-dichlorotetraphenyldisiloxane.

16. A method in accordance with claim 1 which comprises (1) hydrolyzing diphenyldichlorosilane in the presence of hydrogen chloride and an effective amount of pyridine hydrochloride, (2) stripping the resulting hydrolysis mixture, and (3) recovering from (2) as an overhead product, 1,3-dichlorotetraphenyldisiloxane.

17. A method in accordance with claim 1 which comprises (1) hydrolyzing amyltrichlorosilane in the presence of hydrogen chloride and an effective amount of pyridine, (2) stripping the resulting hydrolysis mixture, and (3) recovering from (2) as an overhead product, a chlorine-terminated amylsiloxane hydrolyzate having from 2 to 10 chemically combined amylsiloxy units.

18. A method in accordance with claim 1 which comprises (1) hydrolyzing dimethyldichlorosilane in the presence of hydrogen chloride and an effective amount of pyridine, (2) stripping the resulting hydrolysis mixture, and (3) recovering from (2) as an overhead product, a chlorine-terminated dimethylsiloxane hydrolyzate having from 2 to 10 chemically combined dimethylsiloxy units.

19. A method in accordance with claim 1 which comprises (1) hydrolyzing dimethyldichlorosilane in the presence of hydogen chloride and an effective amount of pyridine hydrochloride, (2) stripping the resulting hydrolysis mixture, and (3) recovering from (2) as an overhead product, a chlorine-terminated dimethylsiloxane hydrolyzate having from 2 to 10 chemically combined dimethylsiloxy units.

References Cited

UNITED STATES PATENTS 2,381,366   8/1945   Patnode _____ 260—607

OTHER REFERENCES

Toshio Takiguchi—Journal Am. Chem. Soc.—81—2359–2361, May 1959.

Burkhard, J.A.C.S. 67, 2173–2174 December, 1945.

TOBIAS E. LEVOW, *Primary Examiner.*

J. P. PODGORSKI, *Assistant Examiner.*